UNITED STATES PATENT OFFICE.

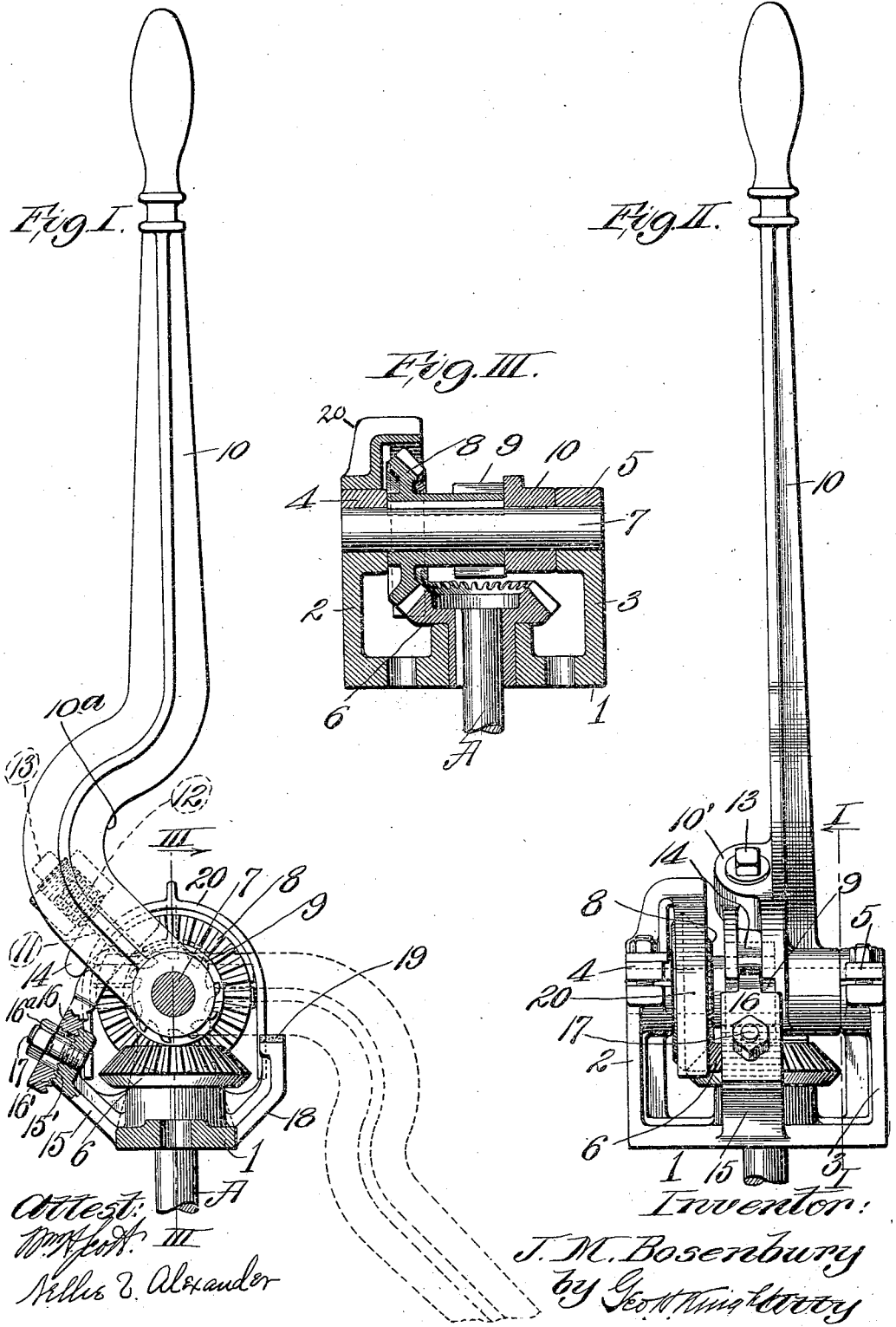

JOSEPH M. BOSENBURY, OF DECATUR, ILLINOIS, ASSIGNOR TO ST. LOUIS CAR COMPANY, OF ST. LOUIS, MISSOURI, A CORPORATION.

RATCHET BRAKE MECHANISM.

No. 855,876.　　　Specification of Letters Patent.　　　Patented June 4, 1907.

Application filed August 25, 1906. Serial No. 331,987.

*To all whom it may concern:*

Be it known that I, JOSEPH M. BOSENBURY, a citizen of the United States of America, residing in Decatur, in the county of Macon and State of Illinois, have invented certain new and useful Improvements in Ratchet Brake Mechanisms, of which the following is a full, clear, and exact description, reference being had to the accompanying drawings, forming part of this specification.

My invention relates to a hand ratchet mechanism for operating the staffs by which the brakes of street railway cars are set, the invention having for its object to furnish a ratchet mechanism of this character which is operated through the medium of a hand lever which is drawn down beneath the plane of its axis whereby a greater degree of leverage may be secured over that ordinarily possible in the use of hand wheels as leverage members.

Figure I is a side elevation of my ratchet mechanism with parts shown in vertical cross section taken on line I—I, Fig. II. Fig. II is a rear elevation of the mechanism; the hand lever being shown drawn down beneath the horizontal plane of its axis. Fig. III is a vertical cross section taken on line III—III, Fig. I.

A designates the vertical brake staff which is adapted to be controlled in the usual manner by a ratchet wheel and pawl located at the floor of the car platform through which the staff extends.

1 designates a horizontal bracket through which the upper end of the brake staff passes and which is provided with a pair of vertical arms 2 and 3. The bracket or bearing 1 is rotatably fitted to the staff of the mechanism, so that it may be rotated relative to said staff for the purpose of properly locating the bearing and its parts when attached to the supporting member to which said bearing is applied when the mechanism is mounted in position for service. The arms 2 and 3 are provided with sockets and said arms are respectively surmounted by caps 4 and 5 that with the socketed upper ends of the arms serve to provide horizontal journal boxes to receive a shaft that will be hereinafter more particularly referred to.

6 is a horizontal bevel-gear wheel keyed to the upper end of the brake staff and journaled in the base of the bracket 1.

7 is a horizontal shaft mounted in the journal boxes of the bracket arms 2 and 3 and having keyed thereto a vertical bevel-gear wheel 8 that is arranged in mesh with the horizontal bevel-gear wheel 6 on the brake staff. 9 is a ratchet wheel rigidly associated with the vertical bevel-gear wheel 8 and preferably being integral with said bevel-gear wheel.

10 designates a hand lever that is loosely mounted at its inner end upon the horizontal shaft 7 and located adjacent to the ratchet wheel 9. 11 is a pawl loosely seated in a box 10' carried by the hand lever 10 and the point of which is adapted to engage the teeth of the ratchet-wheel 9 (see dotted lines Fig. I). The pawl 11 is backed by an expansion spring 12 seated in the box 10' and which acts to press said pawl in a direction toward said ratchet wheel, and for the purpose of securing any desired degree of tension in said spring, I utilize an adjustment screw 13 which is seated in the box 10' and bears against the outer end of the spring 12. The pawl 11 is provided with a heel 14 (see Figs. I and II).

15 designates an arm projecting rearwardly from the central portion of the bracket 1 and 16 is a trip finger supported by said arm and adapted to be engaged by the heel 14 of the pawl 11, for the purpose of causing said pawl to be retracted from the ratchet wheel 9 when the hand lever 10 is raised into a vertical position and the brake staff is to be relieved of control to permit release of the brake shoes previously set to the car wheels. The trip finger 16 is preferably adjustably fitted to the bracket arm 15, in order that it may be raised and lowered on said arm and to provide for the adjustment I preferably form serrations 15' upon the upper face of the arm to which the trip finger is applied, also serrations 16' upon the opposing lower face of the trip finger, provide a longitudinal slot 16ª in the trip finger, and utilize a clamp screw 17 that passes through the slot in the trip finger and enters into the bracket arm 15.

18 is a stop arm projecting forwardly from the base of the bracket 1 and which serves to limit the downward movement of the hand lever 10, the stop arm being preferably surmounted by a rubber or other cushion strip 19.

20 designates a shield surmounting and partially inclosing the vertical bevel-gear wheel 8 on the horizontal shaft 7, for the purpose of preventing the operator of the brake mechanism from accidentally placing his fingers between the intermeshing bevel-gear wheels 8 and 6 and receiving an injury therefrom.

In the practical use of my ratchet brake mechanism the hand lever 10 is drawn forwardly and its pawl 11, which was previously held out of engagement with the ratchet wheel 9 by the trip finger 16, is forced forwardly into engagement with said ratchet wheel and as the movement of the hand lever is continued the ratchet wheel and the bevel-gear wheel 8 with which it is associated, are rotated with the result of causing rotation of the brake staff through the coöperation of the vertical gear wheel 8 with the horizontal gear wheel 6. The forward and downward movement of the hand lever may be continued until said hand lever comes in contact with the stop arm 18 and if this movement is insufficient to cause the setting of the brake by rotation of the brake staff, the hand lever may be readily raised and lowered any necessary number of times to continue the rotation of the horizontal shaft, the horizontal gear-wheel and the brake staff, it being obvious that the brake staff is held from retrograde rotation during such time by the ratchet and pawl associated therewith, and that this being true the hand lever may be readily moved rearwardly so as to cause the pawl to engage a tooth of the ratchet wheel 9 back of the one previously engaged.

When it is desired to release the brake the hand lever is raised into an upright position and immediately upon the heel 14 of the lever carried pawl 11 striking against the trip finger 16 said pawl is retracted to free the ratchet wheel and the parts controlled thereby so that the brake staff, from the ratchet wheel of which the pawl had been previously released, may partake of retrograde rotation with the result of releasing the brakes in the usual manner.

The hand lever 10 is provided near its inner end with a bend 10ª extending rearwardly from a central line drawn longitudinally through the hand lever. The object in providing this bend is to permit of a movement of the outer end of the hand lever in a lower position than would be possible in the absence of the bend, thereby enabling the operator of the mechanism to exert a greater degree of power upon the hand lever owing to the handle end of the hand lever extending into a position that will enable him to place his weight on the hand lever.

A ratchet brake mechanism made in accordance with my invention and in which the brake lever operates in a vertical direction may be installed in a much smaller space than other forms of ratchet brake mechanisms at present in use, so far as I am aware. This is a feature of considerable importance in view of the fact that economy of space on street railway cars is an important item as is well known.

I claim:—

1. In a ratchet brake mechanism, the combination with a vertical brake staff, of a horizontal bevel gear wheel fixed to said staff, a vertical bevel gear wheel coöperating with said horizontal bevel gear wheel, a support for said vertical bevel gear wheel, a ratchet wheel associated with said vertical bevel gear wheel, a loosely supported hand-lever located adjacent to said ratchet wheel and adapted to extend downwardly beneath the horizontal plane of its axis, and a spring pawl carried by said hand lever and arranged for engagement with said ratchet wheel, substantially as set forth.

2. In a ratchet brake mechanism, the combination with a vertical brake staff, of a horizontal bevel gear wheel fixed to said staff, a vertical bevel gear wheel coöperating with said horizontal bevel gear wheel, a support for said vertical bevel gear wheel, a ratchet wheel associated with said vertical bevel gear wheel, a loosely supported hand-lever having a bend near its inner end, located adjacent to said ratchet wheel and adapted to extend downwardly beneath the horizontal plane of its axis, and a spring pawl carried by said hand-lever and arranged for engagement with said ratchet wheel, substantially as set forth.

3. In a ratchet brake mechanism, the combination with a vertical brake staff of a horizontal bevel gear wheel fixed to said staff, a vertical bevel gear wheel coöperating with said horizontal bevel gear wheel, a support for said vertical bevel gear wheel, a ratchet wheel associated with said vertical bevel gear wheel, a loosely supported hand-lever located adjacent to said ratchet wheel, and adapted to extend downwardly beneath the horizontal plane of its axis, a spring pawl having a heel and carried by said hand-lever and arranged for engagement with said ratchet wheel, and a trip finger adapted to engage the heel for withdrawing said pawl from said ratchet wheel, substantially as set forth.

4. In a ratchet brake mechanism, the combination with a vertical brake staff, of a horizontal bevel gear wheel fixed to said staff, a vertical bevel gear wheel coöperating with said horizontal bevel gear wheel, a support for said vertical bevel gear wheel, a ratchet wheel associated with said vertical bevel gear wheel, a loosely supported hand-lever located adjacent to said ratchet wheel and adapted to extend downwardly beneath the horizontal plane of its axis, a spring pawl carried by said hand-lever and arranged for engagement with said ratchet wheel, and an adjustable trip finger adapted to engage the heel for withdrawing said pawl from said ratchet wheel, substantially as set forth.

5. In a ratchet brake mechanism, the combination with a vertical brake staff, of a horizontal bevel gear wheel fixed to said staff, a vertical bevel gear wheel coöperating with said horizontal bevel gear wheel, a support for said vertical bevel gear wheel, a ratchet wheel associated with said vertical bevel gear wheel, a loosely supported hand-lever located adjacent to said ratchet wheel, a spring pawl carried by said hand-lever and arranged for engagement with said ratchet wheel, and a stop-arm for limiting the downward movement of said hand-lever, substantially as set forth.

6. In a ratchet brake mechanism, the combination with a vertical brake staff, of a horizontal bracket surrounding said staff, a horizontal bevel gear wheel fixed to the upper end of said staff and loosely seated in said bracket, a horizontal shaft mounted in said bracket, a vertical bevel gear wheel meshing with said horizontal bevel gear wheel and fixed to said shaft, and having a ratchet wheel associated therewith, a hand-lever loosely mounted on said shaft and adapted to extend downwardly beneath the horizontal plane of its axis, and a spring pawl carried by said hand-lever and arranged for engagement with said ratchet wheel, substantially as set forth.

7. In a ratchet brake mechanism, the combination with a vertical brake staff, of a horizontal bracket surrounding said staff, a horizontal bevel gear wheel fixed to the upper end of said staff and loosely seated in said bracket, a horizontal shaft mounted in said bracket, a vertical bevel gear wheel meshing with said horizontal bevel gear wheel and fixed to said shaft, and having a ratchet wheel associated therewith, a hand-lever loosely mounted on said shaft, a spring pawl having a heel and carried by said hand-lever and arranged for engagement with said ratchet wheel, and a trip finger supported by said bracket and adapted to engage the heel so as to retract said pawl, substantially as set forth.

8. A ratchet brake mechanism comprising a vertical brake staff a horizontal bracket surrounding said staff and having an arm formed with serrations upon its upper face, a horizontal bevel gear wheel fixed to the upper end of said staff and loosely seated in said bracket, a horizontal shaft mounted in said bracket, a vertical bevel gear wheel meshing with said horizontal bevel gear wheel and fixed to said shaft, and having a ratchet wheel associated therewith, a hand-lever loosely mounted on said shaft, a spring pawl having a heel and carried by said hand-lever and arranged for engagement with said ratchet wheel, an adjustable trip finger having serrations upon its lower face and a longitudinal slot and adapted to engage the heel so as to retract said pawl and a clamp-screw passing through the slot and the face of the arm for holding the trip finger to its adjustment.

9. In a brake mechanism, an oscillating lever, a spring controlled rectilinearly reciprocating pawl carried thereby, a shaft, a ratchet keyed thereto, a brake staff, intermediate gearing between the staff and shaft for imparting rotation to the staff upon oscillation of the lever in one direction, and means for disengaging the pawl from the ratchet upon an abnormal throw of the lever in the opposite direction, substantially as set forth.

10. In a brake mechanism, an oscillating lever, a spring controlled rectilinearly reciprocating pawl carried thereby, a shaft, a ratchet keyed thereto, a brake staff, intermediate gearing between the staff and shaft for imparting rotation to the staff upon oscillation of the lever in one direction, a stationary disengaging member located in proximity to the pawl, and an arm or lug on the latter adapted to ride over the surface of said disengaging member, and move the pawl out of engagement with the ratchet for an abnormal throw of the lever in the opposite direction, substantially as set forth.

11. In combination with a rotatable brake staff having a terminal bevel gear, a rotatable adjustable bearing surmounting the staff, a shaft in said bearing, a bevel gear keyed to said shaft and meshing with the staff gear, a ratchet keyed to the shaft, a lever loosely embracing the shaft, a spring controlled rectilinearly reciprocating pawl carried by the lever and engaging the ratchet, and a member or cam interposed in the path of the oscillation of the pawl and adapted to disengage said pawl from its ratchet for an abnormal throw of the lever in proper direction, substantially as set forth.

12. In combination with a rotatable brake staff having a terminal bevel gear, a rotatably adjustable bearing surmounting the staff, a shaft in said bearing, a bevel gear keyed to said shaft and meshing with the staff gear, a ratchet keyed to the shaft, a lever loosely embracing the shaft, a spring controlled rectilinearly reciprocating pawl carried by the lever and engaging the ratchet, a vertically adjustable cam member secured to the bearing, and an arm or lug on the pawl disposed in the path of the cam member, the latter being adapted to move the arm of the pawl and elevate the latter out of engagement with its ratchet for an abnormal throw of the lever toward the cam member, substantially as set forth.

JOSEPH M. BOSENBURY.

In presence of—
C. E. KREBS,
A. H. SISSON.